United States Patent [19]

Wright et al.

[11] Patent Number: 5,380,923
[45] Date of Patent: Jan. 10, 1995

[54] POLYMERIC SULFONIUM SALTS AND METHOD OF PREPARATION THEREOF

[75] Inventors: Bradford B. Wright, Cottage Grove; Omar Farooq, Woodbury; Robert J. DeVoe, Oakdale, all of Minn.

[73] Assignee: Minnesota Mining and Manufacturing Company, St. Paul, Minn.

[21] Appl. No.: 55,031

[22] Filed: Apr. 29, 1993

[51] Int. Cl.⁶ .................. C07C 323/65; C07C 381/12
[52] U.S. Cl. ...................................... 562/113; 568/56; 568/58
[58] Field of Search ...................... 562/113; 568/56, 58

[56] References Cited

U.S. PATENT DOCUMENTS 4,954,416  9/1990  Wright et al. ...................... 430/281

FOREIGN PATENT DOCUMENTS

WO92/04396  3/1992  WIPO ...................... C08G 75/14

OTHER PUBLICATIONS

Fujisawa et al., "Preparation of Poly(alkyl and aryl-p--phenoxphenyl sulfonium salts)", Polymer Letters Edition, Journal of Polymer Science, vol. 11, 1973, pp. 721–724.

The Wall Street Journal, Aug. 29, 1990, p. B1, Naj, A.K.
Chemical and Engineering News, Sep. 10, 1990, p. 26.
Strauss, M. J. Accts. Chem. Res. 1974, 7, pp. 181–188.
Ho et al., J. Chem. Soc. B, 1966, pp. 310–314.
Rudyk et al., Nh. Org. Khim, 1980, 16(12), 2624–5 and English Translation.

*Primary Examiner*—José G. Dees
*Assistant Examiner*—Dwayne C. Jones
*Attorney, Agent, or Firm*—Gary L. Griswold; Walter N. Kirn; Carolyn V. Peters

[57] ABSTRACT

Polymeric triarylsulfonium salts are provided having a repeating structural unit with the formula:

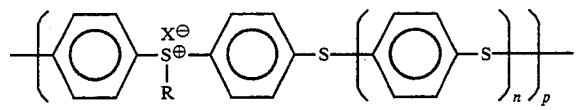

where R represents a substituted or unsubstituted aryl group, $X^-$ represents a non-nucleophilic anion, n represents an integer greater than or equal to 0 and p represents an integer greater than or equal to 2 and may be prepared by combining (a) an arylbis(p-fluorophenyl)-substituted sulfonium salt with a bis(trimethylsilylated)-dithiol in a polar aprotic solvent.

16 Claims, No Drawings

POLYMERIC SULFONIUM SALTS AND METHOD OF PREPARATION THEREOF

TECHNICAL FIELD

This invention relates to sulfonium salt containing polymers, and in particular to polymeric triarylsulfonium salts wherein the sulfonium ion is within the backbone of the polymer.

BACKGROUND OF THE INVENTION

Lewis acid doped polyphenylene sulfide (PPS) films have been shown to be semiconductors under controlled conditions. That property coupled with their electrical insulating properties in the undoped form make them suitable candidates for the fabrication of semiconducting devices. However, the physical properties of PPS (e.g., its intractable nature, and poor processibility) do not allow for facile preparation of miniaturized electronic devices having intricate circuit patterns.

To address that problem polymeric sulfonium salts were prepared by phenylation of polyphenylene sulfide through the thermal decomposition of diphenyliodonium salts (*The Wall Street Journal*, Aug. 29, 1990, page B 1; and *Chemical and Engineering News*, Sep. 10, 1990, page 26), and PCT published patent application WO 92/04396 (Internat. Appl. No. PCT/US91/05301). It was reported that, on photolysis under inert atmosphere, those polymeric sulfonium salts formed black metallic semiconducting polyphenylene sulfide. The method used to prepare those sulfonium salts involves reaction with polyphenylene sulfide which, as mentioned above, is an intractable polymer having limited solubility at temperatures below 200° C. Further, though the specific stoichiometry of the polymers in the art is unknown, the method used to prepare them would lead to random placement of the sulfonium salt centers along the polymer backbone.

Nucleophilic aromatic substitution has been used for studied for many years as a way to prepare aromatic compounds including polymers such as PPS (for example, see Meisenheimer, *J. Ann.* 1901, 323, 205; Strauss, M. J. *Accts. Chem. Res.* 1974, 7, 181; Ho, K. C.; Miller, J.; Wong, K. W. *J. Chem. Soc. B* 1966, 310). Generally, the reaction is best carried out in a polar aprotic solvent at elevated temperature (i.e., >150° C.) in order to provide a reasonable reaction rate.

U.S. Pat. No. 4,954,416 and the cited references disclose the reaction of fluorinated arylsulfonium salts with nucleophiles such as amines with production of hydrogen fluoride.

U.S. Pat. No. 4,954,416 and the cited references disclose the reaction of fluorinated arylsulfonium salts with nucleophiles such as amines with production of hydrogen fluoride.

The reaction of a methyl(trimethylsilyl)benzotriazole with aryl fluorides in N,N-dimethylformamide (a polar aprotic solvent was disclosed by Rudyk, V. I.; Troitskaya, V. I.; Yagupol'skii, L. M. *Zh. Org. Khim.* 1980, 16(12), 2624–5.

When combined with the reported organic solvent solubility of the polymeric sulfonium salt, this technology appears to provide a route to solvent coatable, photoimageable semiconducting polymers for microelectronic applications. Additionally, the polymeric sulfonium salts of the present invention are useful as photoinitiators for cationic and free-radical curing applications.

SUMMARY OF THE INVENTION

In one aspect, polymeric triarylsulfonium salts are provided having a repeating structural unit with the formula:

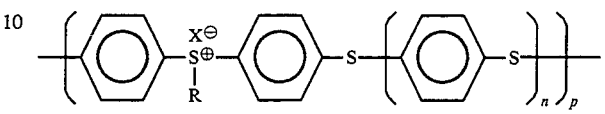

wherein
R represents a substituted or unsubstituted aryl group, X⁻ represents a non-nucleophilic anion, n represents an integer greater than or equal to 0 and p represents an integer greater than or equal to 2.

In another aspect, polymeric triarylsulfonium salts of the present invention may be prepared by (1) combining in a polar aprotic solvent (a) an arylbis(p-fluorophenyl)substituted sulfonium salt having the formula:

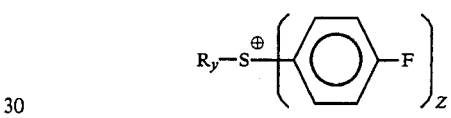

wherein R is defined as above, y is 0, 1 or 2, and z is 1, 2 or 3 with the proviso y+z=3;

(b) with a bis(trimethylsilylated)dithiol having the formula:

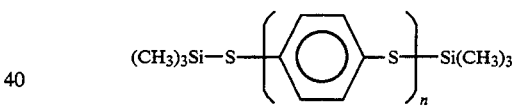

wherein n is any integer greater than or equal to 0, (2) heating the mixture until the reaction is complete, and (3) isolating the polymer.

In yet another aspect of the present invention, a method for condensing comprises the steps:

(1) combining a mono-, di- or trifluorinated aromatic compound with a trimethylsilyl mercaptide in a polar aprotic solvent;

(2) heating the mixture until the reaction is complete, and (3) isolating the reaction product.

An advantage of the processes of the present invention is that, since the co-product of the reaction is gaseous, reactions may be run in stoichiometric quantities instead of in the presence of a large excess of nucleophile. In addition, the reaction does not need to be thermodynamically favorable, merely thermally accessible, since the removal of trimethylsilyl fluoride forces the reaction to completion.

The synthetic method of our invention allows us to prepare polymeric sulfonium salts by a condensation polymerization of soluble monomers. Thus, due to our method of synthesis our polymers have highly controlled and regular sulfonium center placement. It is also likely that the sulfonium containing polymers cited above have substantially low sulfonium content, when compared to the materials of the present invention.

The polysulfonium salts of the present invention are useful for curing cationic and free-radically cured monomers by photolysis.

As used in this application:

"sulfonium center" refers to a structural unit having the following formula:

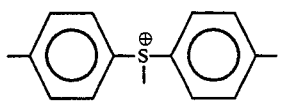

and

"spacer" is a sulfur-containing divalent linking group for connecting the sulfonium centers.

DESCRIPTION OF THE PREFERRED EMBODIMENTS(S)

Novel polymeric triarylsulfonium salts having the formula:

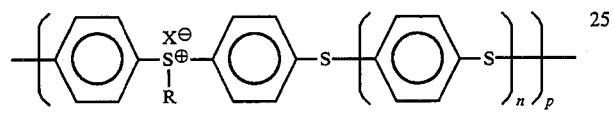

have been prepared by condensation of arylbis(4-fluorophenyl)sulfonium salts with silylated mercaptide nucleophiles in polar aprotic solvents;

wherein:

R represents an aryl or substituted aryl group having from about 1 to 30 carbon atoms. Non-limiting examples of R include phenyl, tolyl, 1-naphthyl, dialkylaminophenyl, benzoylphenyl, carboxyphenyl, morpholinophenyl, chlorophenyl, iodophenyl, bromophenyl, etc. The of R as 4-fluorophenyl may be desirable but will result in crosslinking of the sulfonium salt containing polymer and is not useful where solubility is desired. Preferably, R represents a phenyl or substituted phenyl group, most preferably R is phenyl or tolyl. The choice of substituent is important if photocleavage of the R group is desired. Electron withdrawing substituents (i.e., those substituents with a Hammett $\sigma_{para}$ parameter greater than that of H) increase the relative amount of R group cleavage to main chain scission. Conversely, electron donating substituents (i.e., those substituents with a Hammett $\sigma_{para}$ parameter less than that of H) increase the relative amount of R group cleavage to main chain scission. When semiconducting behavior is desired R should have no abstractable hydrogen atoms (i.e., R should preferably be phenyl, naphthyl, phenoxyphenyl, etc.);

$X^-$ represents a non-nucleophilic anion. Due to the nature of the polymerization reaction the choice of counterion for the sulfonium cation is very important. It is essential that the anion be non-nucleophilic so the anion cannot compete effectively with mercaptide to displace the aryl fluoride. Also, it is important that the counterion not be capable of reducing the triarylsulfonium salt co-monomer or polymer at the temperature at which the reaction is carried out. Finally, the counterion must not be a source of fluoride ion that can react with the silathiane. This can be easily determined by adding the silathiane to a solution of tetrabutylammonium $X^-$. If heat and gas are generated then the anion is unsuitable. Examples of unsuitable anions include hexfluorophosphate, hexafluoroantimonate, and tetrafluoroborate;

n is an integer greater than or equal to 0. While availability of synthetic precursors, reaction kinetics, and solubility considerations favor a value of n ranging from 0 to 5, preferably from 0 to 3, and more preferably from 0 to 1, inclusive, larger values of n are desirable from the standpoint of lessening the light exposure required to generate conducting PPS. In principal, any value of n that is greater than or equal to 0 may be prepared according to the method of the present invention; and p is an integer greater than equal to 2, preferably p is an integer that is sufficient to give a polymer having a $M_w$ of at least 20,000, more preferably at least 40,000 and most preferably at least 60,000.

The polymers of the present invention may be prepared by combining in a polar aprotic solvent (1) an aryl(p-fluorophenyl)substituted sulfonium salt having the formula:

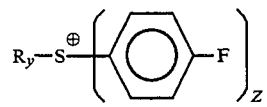

with (2) a bis(trimethylsilyl)dithiol having the formula:

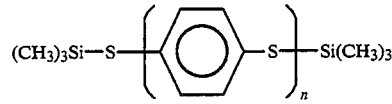

wherein n is any integer greater than or equal to 0, in a polar aprotic solvent and heating to about 100° C. for several hours. This condensation polymerization relies on the affinity of the trimethylsilyl groups for fluoride ion. While not wishing to be bound by theory, it is believed that fluoride ion displaces sulfide ion on the co-monomer hexamethyldisilathiane, which then displaces fluoride in a nucleophilic aromatic substitution reaction of the aryl fluoride followed by a chain mechanism until the bis(trimethylsilyl)dithiol is used up. It is preferred that the trimethylsilyl group that is bound to the mercaptide nucleophile be trimethylsilyl since the resultant trimethylsilyl fluoride is a gas which removes itself spontaneously from the reaction mixture.

In addition to the preparation of polymeric triarylsulfonium salts the process of the present invention is useful for the condensation of aryl fluorides in general. Typically, a mono-, di-, or tri-fluorinated aromatic compound is mixed with a silylated nucleophile in a polar aprotic solvent. The mixture is heated and evolution of trimethylsilylfluoride gas occurs. Heating is continued until the reaction is complete by analysis (e.g., gas chromatography, thin layer chromatography, etc.). The product is then isolated by pouring the reaction mixture into water or brine and extracting the product into an organic solvent.

The choice of fluorinated aromatic compounds on which the invention may be practiced includes fluorobenzenes having one or more additional electron withdrawing groups. Additional electron withdrawing groups should be at ortho- or para-positions relative to the fluoro-substituent and should have a cumulative Hammett $\sigma_{para}$ parameter greater than or equal to that of phenyl (i.e., about 0.01). Preferably, the cumulative Hammett $\sigma_{para}$ parameter is greater than or equal to that of acetyl (i.e., about 0.50). More preferably, the cumulative Hammett $\sigma_{para}$ parameter should be greater than or equal to that of cyano (i.e., about 0.66).

The choice of solvent is limited to polar aprotic solvents, particularly those having a dipole moment greater than or equal to that of acetonitrile (i.e., about 3.44 Debye). Non-limiting examples of suitable solvents include hexamethylphosphoramide, dimethyl sulfoxide, nitromethane, N-methylpyrrolidone, N,N-dimethylformamide, acetonitrile, etc. Preferably, the dipole moment is greater than or equal to that of nitromethane (i.e., about 3.56 Debye). More preferably the solvent is dimethyl sulfoxide, nitromethane and hexamethylphosphoramide. While dimethyl sulfoxide may be used as a solvent for this reaction, it has demonstrated reactivity with hexamethylsiladithiane making it unsuitable for reactions with that compound.

The (trimethylsilyl)dithiol that may be used to prepare polymers of the invention may be purchased as in the case of bis(trimethylsilyl)sulfide, or prepared by silylation of the corresponding thiol with trimethylsilyl chloride and a tertiary amine. Aryl thiols may be purchased or synthetically prepared, for example, by reduction of the corresponding sulfonic acid. It is also possible to carry out the synthesis of the polymers of the present invention through the condensation of mercaptide salts (e.g., sodium mercaptides, lithium mercaptides, potassium mercaptides, ammonium mercaptides, etc.) with fluoroarylsulfonium salts under the same or similar conditions. However that approach would lead to problems such as salt precipitation (e.g., sodium hexfluorophosphate) and mixture of polymeric sulfonium salts and fluoride salts that would be difficult to separate.

An advantage of the process of the present invention is that, since the co-product of the reaction is gaseous, reactions may be run in stoichiometric quantities instead of in the presence of a large excess of nucleophile. In addition, the reaction does not need to be thermodynamically favorable, merely thermally accessible, since the removal of trimethylsilyl fluoride forces the reaction to completion.

While not required to carry out the process of the invention, it is generally advantageous to add a catalytically effective amount of an aprotic solvent soluble source of fluoride ion (e.g., cesium fluoride, tetrabutylammonium fluoride, etc.) to lower the required reaction temperature and increase the reaction rate. The source of fluoride ion may be present in amounts up to 20% by weight of the aryl fluoride, preferably less than 5%, more preferably less than 2%. When (trimethylsilyl)thiophenolates are employed as a silylated nucleophile, diphenyldisulfide is formed, presumably by homolytic cleavage of the sulfur-silicon bond, and recoupling. Therefore, catalysis by fluoride ion is highly desirable in those cases, while employing low temperatures (e.g., 80° to 100° C.).

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

All materials used in the examples were purchased from standard chemical suppliers unless otherwise noted. The polymers and intermediates were characterized by one or more of the following techniques: $^1$H NMR, $^{13}$C NMR, IR, GPC, FAB MS, melting point. Hexamethyldisilathiane was purchased from Aldrich Chemical Co. at 98% purity and used without further purification.

Example 1

This example illustrates the preparation of sulfonium salt co-monomers. Bis(4-fluorophenyl)-4-tolylsulfonium methanesulfonate/phosphate was prepared as a solution in water as follows:

Bis(4-fluorophenyl) sulfoxide (20 grams) was added to 54.22 grams 98% methanesulfonic acid containing 8 grams anhydrous phosphorus pentoxide powder and 50 grams toluene. The mixture was heated to reflux with stirring under dry nitrogen for 24 hr. The resulting brown mixture was poured into 300 grams of ice-water and washed with three 50 ml portions of methylene chloride. This solution is referred to herein as Solution A.

Example 2

This example demonstrates metathesis of the sulfonium counterion. To a sample of Solution A prepared from 20 grams bis(4-fluorophenyl) sulfoxide was added an aqueous solution containing 1.3 equivalents of lithium trifluoromethanesulfonate. After a brief heating, the mixture was cooled and the precipitate was collected by filtration. The precipitate was dissolved in methylene chloride, dried over anhydrous magnesium sulfate, and reprecipitated by addition of diethylether to give 20 grams bis(4-fluorophenyl)-4-tolylsulfonium trifluoromethanesulfonate.

In a similar manner, 1.3 equivalents of sodium tetraphenylborate were added to Solution A to give bis(4-fluorophenyl)-4-tolylsulfonium tetraphenylborate.

Example 3

This example describes the preparation of triarylsulfonium salt polymers. In a dry box under argon, a 250 ml Schlenk flask was charged with 5 grams bis(4-fluorophenyl)-4-tolylsulfonium trifluoromethanesulfonate, 2 grams hexamethyldisilathiane and 10 grams hexamethylphosphoramide (HMPA) under argon. The flask was heated under argon to 220° C. for two days resulting in a dark viscous mixture. The mixture was cooled to room temperature and diluted with dichloromethane. Addition of diethyl ether resulted in the precipitation of a brown solid, which after reprecipitation gave an off-white solid (1) which was a polymeric triarylsulfonium salt with the repeating unit:

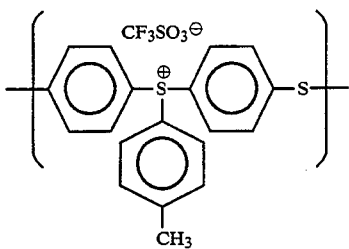

In a similar manner by replacing the bis(4-fluorophenyl)-4-tolylsulfonium trifluoromethanesulfonate with bis(4-fluorophenyl)-4-tolylsulfonium tetraphenylborate. The polymeric sulfonium salt (2) was prepared which had the repeating unit:

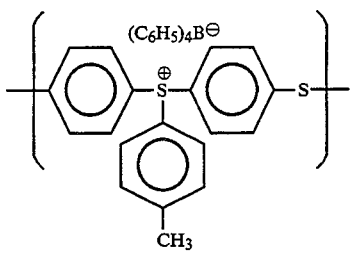

The results of GPC on polymers 1 and 2 prepared by this method are given in Table 1.

TABLE 1

Molecular Weight and Distribution of Polymeric Sulfonium Salts Measured by Gel Permeation Chromotography

| Polymer | Counterion | Polymer Fraction | Molecular Weight (g/mol) | | |
|---|---|---|---|---|---|
| | | | $M_w$ | $M_n$ | $M_w/M_n$ |
| 1, lot 1 | $CF_3SO_3^-$ | A | 30,323 | 29,173 | 1.04 |
| | " | B | 7,492 | 4,930 | 1.52 |
| 1, lot 2 | " | A | 16,545 | 15,883 | 1.04 |
| | " | B | 5,096 | 4,763 | 1.07 |
| 1, lot 3 | " | A | 9,850 | 9,583 | 1.03 |
| | " | B | 4,701 | 4,528 | 1.04 |
| 2 | $(C_6H_5)_4B^-$ | — | 7,605 | 5,401 | 1.41 |

Example 4

This example demonstrates preparation of triarylsulfonium salt polymers using a fluoride ion catalyst to enhance the reaction yield and speed. A dry 250 ml Schlenk flask was charged with 5 grams bis(4-fluorophenyl)-4-tolylsulfonium trifluoromethanesulfonate in a dry box, 2 grams hexamethyldisilathiane, and 10 grams dry nitromethane under argon. To the mixture was then added 0.05 gram cesium fluoride in N,N-dimethylfonnamide. The reaction was heated to reflux for two days resulting in a viscous material. On cooling and diluting the material with dichloromethane the polymer was precipitated from diethyl ether as a colored (brown) material. Further purification gave an off-white (brownish) material which was characterized by appropriate spectroscopy and chromatography.

Example 5

This example demonstrates the preparation of polymeric tetraphenylborate salt using fluoride ion catalysis. The bis(4-fluorophenyl)-4-tolylsulfonium trifluoromethanesulfonate of Example 4 was replaced by the corresponding tetraphenylborate salt and the reaction and subsequent work up of the resulting material were carried out under identical conditions.

Example 6

This example demonstrates the preparation of sulfonium trifluoromethanesulfonate polymers having 1,4-phenylenedisulfide spacers between the sulfonium centers. The hexamethyldisilathiane in Example 4 was replaced by 1,4-bis(trimethylsilylthio)benzene and the reaction and subsequent work up of the resulting material were carried out under identical conditions.

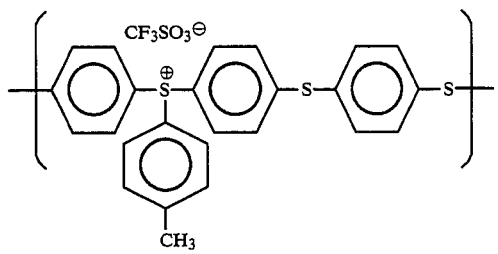

Example 7

This example shows the preparation of sulfonium tetraphenylborate polymers with a phenylene disulfide spacer. The hexamethyldisilathiane in Example 5 was replaced by 1,4-bis(trimethylsilylthio)benzene and the reaction and subsequent work up of the resulting polymer were carried out as in Example 5.

Example 8

This example shows the use of other fluorinated catalysts. The cesium fluoride in Examples 4 through 7 was replaced by cyanuric fluoride and tetrabutylammonium fluoride and the resulting reaction mixtures were prepared as in Examples 4–7 and similar results were obtained.

Example 9

This example demonstrates additional applications of nucleophilic aromatic substitution to aryl fluorides.

Aryl fluoride (17.5 mmol), 10 grams nitromethane, and 17.7 mmol (3.20 grams) S-trimethylsilylthiophenol were combined and heated to reflux under dry nitrogen overnight. The reaction was analyzed by $^1H$ NMR and gas chromatography/mass spectroscopy. The results of analysis for materials in Table 2 indicated the formation of diphenyl disulfide in additional to the listed aryl sulfide. In general, the relative amount of diphenyl disulfide (as judged by GCMS) rose linearly with the cumulative Hammett $\sigma_{para}$ value.

TABLE 2

| Aryl Fluoride | Product |
|---|---|
| 1-fluoro-4-nitrobenzene | 4-nitrodiphenyl sulfide |
| 1-fluoro-2,4-dinitrobenzene | 2,4-dinitrodiphenyl sulfide |
| 4-cyano-1-fluorobenzene | 4-cyanodiphenyl sulfide |
| 4,4'-difluorobenzophenone | 4,4'-di(thiophenoxy)benzophenone |
| 4,4'-difluorodiphenyl sulfoxide | 4,4'-di(thiophenoxy)diphenyl sulfoxide |
| 1,4-difluorobenzene | polyphenylene sulfide (intractable) |
| 4-fluorobenzene | diphenyl sulfide |
| 4-fluoroacetophenone | 4-acetyldiphenyl sulfide |

Examples 11 and Comparative Example 1

This example demonstrates curing of cationic and free-radically cured monomers by photolysis of the polysulfonium salts of the present invention. A stock solution of 10 parts of pentaerythritol tetraacrylate (SR 295, Sartomer) and 90 parts methyl ethyl ketone was prepared. Two samples were prepared as follows:

Example 11

To 50 parts of stock solution was added 1 part sulfonium salt polymer 1 ($M_w = 4.1 \times 10^4$ and $M_n = 3.9 \times 10^4$). The resulting solution was coated on a polyester film with a 6 mil doctor blade and the MEK was allowed to evaporate.

Comparative Example 1

To 50 parts of stock solution was added 1 part bis(4-fluorophenyl) (4-methylphenyl)sulfonium trifluoromethanesulfonate. The resulting solution was coated on a polyester film with a 6 rail doctor blade and the solvent was allowed to evaporate.

Parts of each sample were exposed on a web to UV light from a 250 watt Fusion Systems UV light (D Bulb) at two web speeds, under a nitrogen blanket, and the samples were tested for completeness of curing (tack free).

TABLE 3

| Example | Web Speed of 100 ft/min | Web Speed of 200 ft/min |
|---------|-------------------------|-------------------------|
| 11      | cured                   | cured                   |
| C1      | cured                   | not cured               |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A polymeric triarylsulfonium salt comprising a repeating structural unit having the formula:

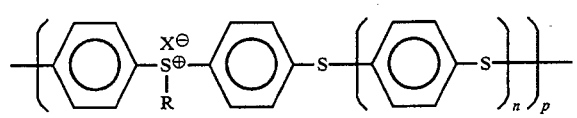

wherein
R represents a substituted or unsubstituted aryl group, X⁻ represents a non-nucleophilic anion, n represents an integer greater than or equal to 0 and p represents an integer greater than 2.

2. The polymeric triarylsulfonium salt according to claim 1 wherein R represents an aryl or substituted aryl group having from about 1 to 30 carbon atoms.

3. The polymeric triarylsulfonium salt according to claim 2 wherein R is a phenyl or substituted phenyl group.

4. The polymeric triarylsulfonium salt according to claim 3 wherein the substituted phenyl group has substituents with a Hammett $\sigma_{para}$ parameter greater than that of H.

5. The polymeric triarylsulfonium salt according to claim 3 wherein the substituted phenyl group has substituents with a Hammett $\sigma_{para}$ parameter less than that of H.

6. The polymeric triarylsulfonium salt according to claim 3 wherein X⁻ is trifluoromethanesulfonate or tetraphenylborate.

7. The polymeric triarylsulfonium salt according to claim 3 wherein n is 0 or 1.

8. The polymeric triarylsulfonium salt according to claim 1 having a repeating unit with the formula:

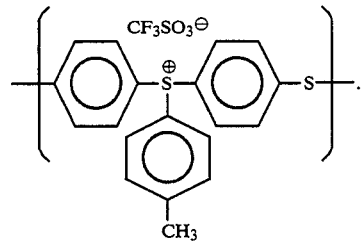

9. The polymeric triarylsulfonium salt according to claim 1 having a repeating unit having the formula:

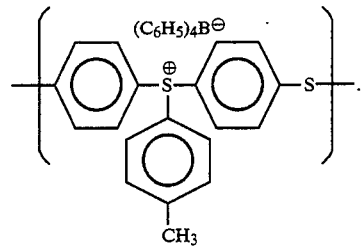

10. The polymeric triarylsulfonium salt according to claim 1 having a repeating unit with the formula:

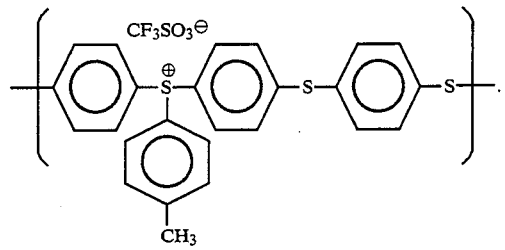

11. A polymeric triarylsulfonium salt that is a reaction product of an arylbis(p-fluorophenyl)sulfonium salt and a bis(trimethylsilylated)dithiol having the formula:

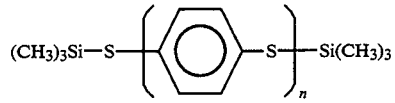

wherein n is any integer greater than or equal to 0.

12. The polymeric triarylsulfonium salt further including a fluoride ion containing catalyst.

13. A method of preparing a polymer comprising the steps:

(1) combining in a polar aprotic solvent, (a) an aryl-bis(p-fluorophenyl)substituted sulfonium salt having the formula:

wherein R represents a substituted or unsubstituted aryl group, y is 0, 1 or 2, and z is 1, 2 or 3 with the proviso y+z=3;

(b) with a bis(trimethylsilylated)dithiol having the formula:

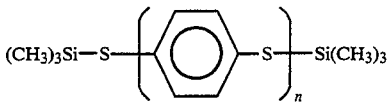

wherein n is any integer greater than or equal to 0, (2) heating the mixture until the reaction is complete, and (3) isolating the polymer.

14. The method according to claim 13 further including adding a catalyically effective amount of an aprotic solvent soluble source of fluoride ion to lower the reaction temperature and increase the reaction rate.

15. The method according to claim 13 wherein the aprotic solvent is hexamethylphosphoramide, dimethyl sulfoxide, or nitromethane.

16. The method according to claim 15 wherein the aprotic solvent is nitromethane.

* * * * *